United States Patent
Smith

(10) Patent No.: US 11,294,022 B2
(45) Date of Patent: Apr. 5, 2022

(54) WAKE AND SHOCKWAVE GUNSHOT DETECTION

(71) Applicant: THALES HOLDINGS UK PLC, Berkshire (GB)

(72) Inventor: Jonathan Neil Smith, Somerset (GB)

(73) Assignee: THALES HOLDINGS UK PLC, Berkshire (GB)

( * ) Notice: Subject to any disclaimer, the term of this patent is extended or adjusted under 35 U.S.C. 154(b) by 362 days.

(21) Appl. No.: 16/520,682

(22) Filed: Jul. 24, 2019

(65) Prior Publication Data

US 2020/0110147 A1 Apr. 9, 2020

(30) Foreign Application Priority Data

Jul. 24, 2018 (GB) ...................................... 1812063

(51) Int. Cl.
*G01S 3/808* (2006.01)
*G01S 11/14* (2006.01)
*H04R 3/00* (2006.01)

(52) U.S. Cl.
CPC ............ *G01S 3/8086* (2013.01); *G01S 11/14* (2013.01); *H04R 3/005* (2013.01)

(58) Field of Classification Search
CPC ......... G01S 3/8086; G01S 11/14; G01S 3/80; G01S 5/18; G01S 3/802; H04R 3/005; F41H 11/00
See application file for complete search history.

(56) References Cited

U.S. PATENT DOCUMENTS

| | | | |
|---|---|---|---|
| 5,586,086 A | 12/1996 | Permuy et al. | |
| 6,198,694 B1 * | 3/2001 | Kroling | F41J 5/06 367/127 |
| 10,274,347 B2 * | 4/2019 | Smith | G01D 11/245 |
| 2006/0044943 A1 | 3/2006 | Barger et al. | |
| 2015/0160047 A1 * | 6/2015 | Savage | G01D 11/245 73/649 |
| 2020/0110147 A1 * | 4/2020 | Smith | G01S 11/14 |
| 2020/0333110 A1 * | 10/2020 | Smith | G01S 3/80 |

FOREIGN PATENT DOCUMENTS

| | | | | |
|---|---|---|---|---|
| AU | 2019208139 A1 * | 2/2020 | ............. | G01S 5/18 |
| AU | 2019208147 A1 * | 2/2020 | ............. | G01S 3/80 |
| AU | 2015258277 B2 * | 10/2020 | ............. | H04R 1/406 |
| CA | 2878745 A1 * | 7/2016 | ............. | H04R 1/086 |
| CA | 3050434 A1 * | 1/2020 | ............. | G01S 3/80 |

(Continued)

OTHER PUBLICATIONS

Extended European Search Report from corresponding European Application No. 19187429.6, dated Dec. 16, 2019, pp. 1-8, European Patent Office, Munich, Germany.

(Continued)

*Primary Examiner* — Daniel Pihulic
(74) *Attorney, Agent, or Firm* — Hauptman Ham, LLP

(57) ABSTRACT

Detection of a trajectory of a supersonic projectile is carried out derived from a plurality of acoustic detection signals. From these acoustic detection signals, two or more shockwave-derived trajectory estimates can be derived. Further, a wake derived trajectory bearing estimate can be derived, from which disambiguation of the shockwave-derived trajectory estimates can be effected.

15 Claims, 7 Drawing Sheets

(56) References Cited

FOREIGN PATENT DOCUMENTS

| | | | | |
|---|---|---|---|---|
| CA | 3050436 A1 | * | 1/2020 | ............... G01S 3/80 |
| DK | 2884762 T3 | * | 2/2019 | .......... G01D 11/245 |
| EP | 2884762 B1 | * | 10/2018 | ............. H04R 1/406 |
| EP | 3599478 A1 | * | 1/2020 | ............... G01S 5/18 |
| EP | 3599479 A1 | * | 1/2020 | ............... G01S 3/80 |
| EP | 3599479 B1 | * | 4/2021 | .............. F41H 11/02 |
| ES | 2707974 T3 | * | 4/2019 | .......... G01D 11/245 |
| FR | 2751756 A1 | * | 1/1998 | ............ G01S 17/66 |
| GB | 2575830 A | * | 1/2020 | ............... G01S 3/80 |
| GB | 2575831 A | * | 1/2020 | ............. F41G 3/147 |
| PL | 2884762 T3 | * | 4/2019 | .......... G01D 11/245 |
| WO | 9316395 A1 | | 8/1993 | |
| WO | 9607109 A1 | | 3/1996 | |
| WO | 9737194 A1 | | 10/1997 | |
| WO | 2006096208 A2 | | 9/2006 | |
| WO | 2011133837 A2 | | 10/2011 | |

OTHER PUBLICATIONS

United Kingdom Combined Search and Examination Report from corresponding Great Britain Application No. 1812063.4, dated Jan. 24, 2019, pp. 1-6, Intellectual Property Office, South Wales, United Kingdom.

* cited by examiner

WAKE AND SHOCKWAVE GUNSHOT DETECTION

FIELD

Embodiments described herein relate to the detection of a gunshot.

BACKGROUND

Circumstances arise in which it is desirable to detect a projectile fired from a gun, and to determine, with reasonable certainty, an estimated source of the gunfire.

Techniques known in the field rely on the detection of acoustic features indicative of the firing of or progress of a supersonic projectile. Such features include a shockwave, produced by the motion of the projectile at a supersonic speed, or the sound of a muzzle blast.

In practice, it is common for the muzzle blast to be undetectable by audio detectors. This can be because sound attenuates with distance. Also, other sounds generated in the environment, such as vehicle noise, can mask such a sound. This renders the detection of a gunshot, by monitoring for sounds having the signature of a muzzle blast, to be unreliable.

Hence, in many cases, it has proven necessary to rely solely on monitoring for a shockwave. However, the solution of a shockwave's propagating sound gives ambiguous answers, making it difficult to decide, with certainty, the likely source of a projectile the cause of the shockwave.

The nature of this ambiguity is discussed in the context of an embodiment below. However, in short, the information gained from detection of a shockwave is insufficient to derive a single estimate for the trajectory of the projectile causing the shockwave. Instead, the analysis can only derive two possible candidate estimates. This type of ambiguity has many mathematical analogies. For instance, many physical problems can be described in the form of a quadratic equation. A quadratic equation will normally have two solutions. Only one of these solutions may be the correct answer to the presented problem, but other information or constraints are required in order to determine which of the two possible solutions is the correct one.

Clearly, in many situations, operators of gunshot trajectory estimating equipment have a present need to determine, with a degree of certainty, a single candidate estimate, and ambiguous answers may be useless.

A possible approach to resolving this ambiguity is to determine the curvature of the wave-front of the shockwave. This can be achieved by an array of suitably spaced acoustic sensors. However, the spacing required between acoustic detectors to enable detection of this geometry can be inconveniently large, and it is only effective for short miss distances—that is, the distance from the point of measurement to the trajectory of the projectile.

FIGURES

DESCRIPTION OF EMBODIMENTS

In general terms, embodiments disclosed herein involve determining the existence and trajectory of a gunshot, and thereby a bearing back to the origin of the gunshot, using a method of processing an acoustic signal so as to identify a wake signature and a shockwave. The combination of such permits discrimination against solitary shockwaves caused by events other than gunfire, such as the impact of a tank track against a tank wheel. In short, wake information can be used to discriminate between ambiguities which may arise from use of shockwave bearing measurements.

In general terms, an embodiment as described herein comprises a gunshot sensor for determining the existence of a gunshot. From received information, the gunshot sensor can obtain an estimate of trajectory of a supersonic projectile.

The gunshot sensor of an embodiment comprises an acoustic sensor, operable to convert received acoustic oscillations into electrical signals, and a signal processor operable to process such electrical signals. The processing is capable of determining the signature, in an electrical signal, of a shockwave, followed by the signature of a wake of a projectile and, if discernible, the muzzle blast of a gun from which such a projectile has been fired.

On detection of a shockwave signature and a wake signature, subsequent processing can determine an estimate of the trajectory without ambiguity.

The reader will appreciate that removing ambiguity does not imply removal of doubt. There will still be inherent measurement error associated with all processing steps, and this will lead to an uncertainty bound around each estimate. However, this will provide a user with at least a strong indication as to the general direction from which a projectile has emanated, rather than alternative approaches which can give no certainty as to which, of two possible directions, is the correct answer.

Figure 1:
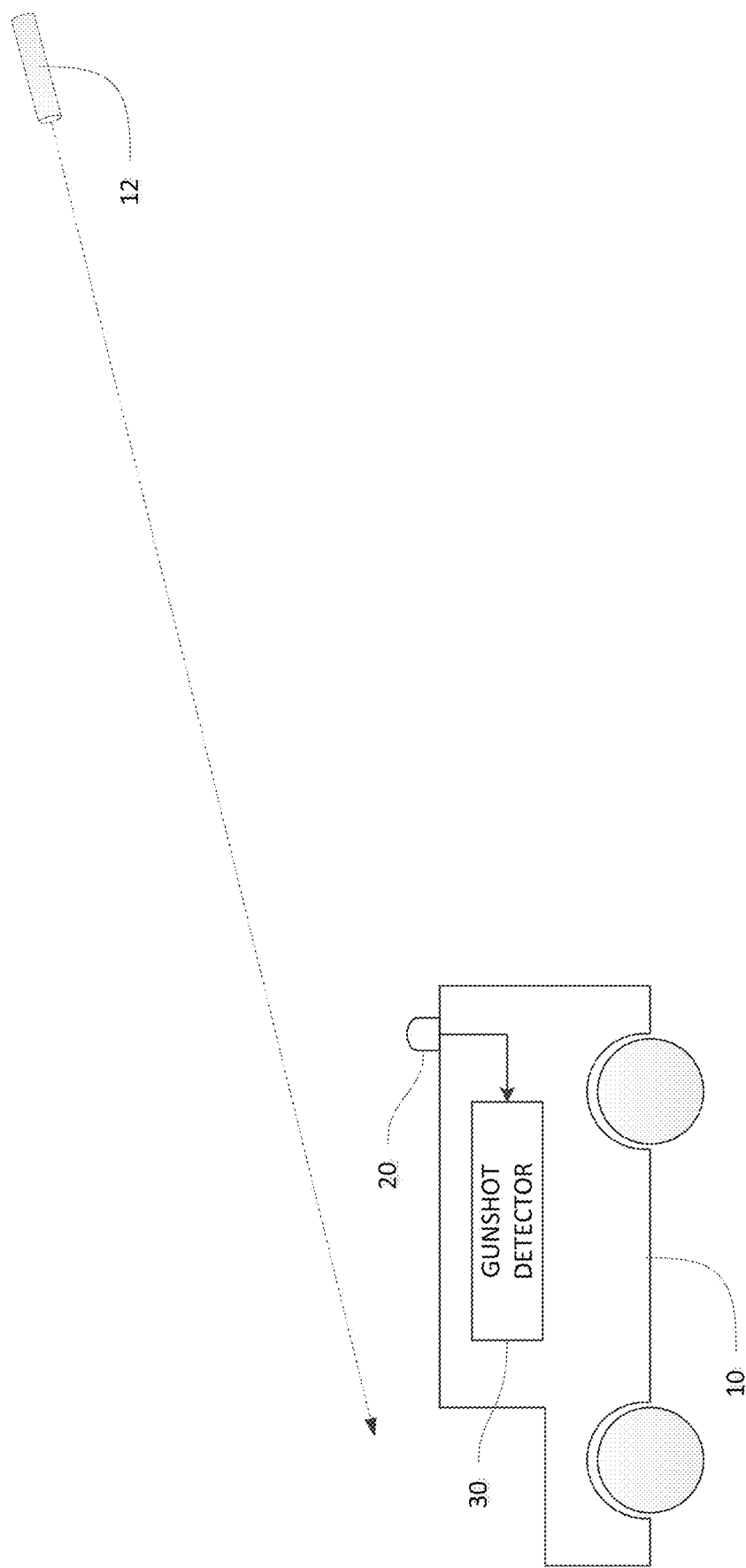
FIG. 1 is a schematic illustration of an implementation of an embodiment.

FIG. 1 illustrates an embodiment, in which a vehicle 10 is equipped with an acoustic sensor 20 connected to a gunshot detector 30. The gunshot detector 30 may, in certain embodiments, be connected to other on-board electronic equipment, such as a navigation system, so that the outcome of gunshot detection can be integrated with navigation data so as to present location information to a user.

A scenario is illustrated whereby a bullet is fired from a firearm 12. The trajectory of the bullet is illustrated in broken line.

Figure 2:
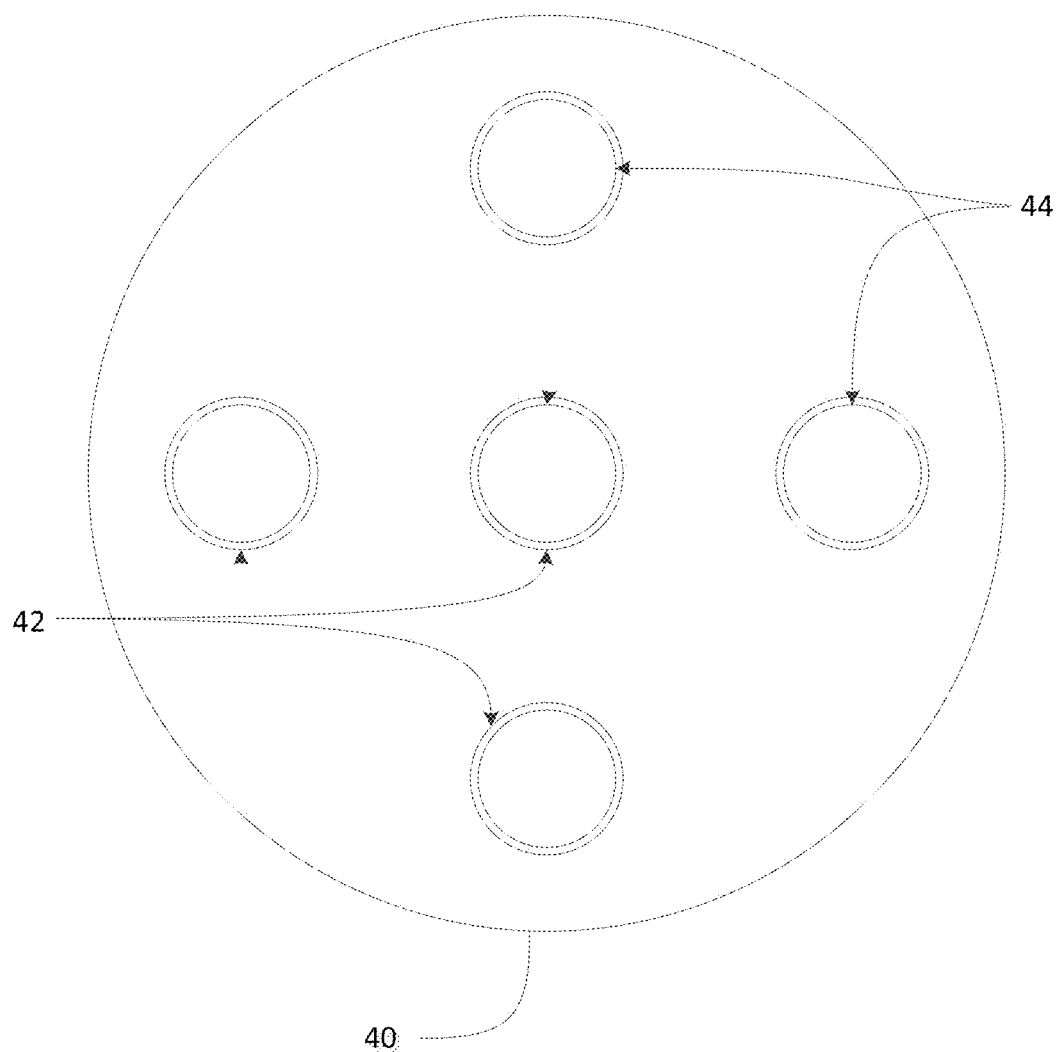
FIG. 2 is a plan view of a sensor plate of a sensor of the illustrated embodiment.

The acoustic sensor 20 is of known type, as described in European Patent Application EP2884762A1. The acoustic sensor 20 includes a circular sensor plate 40, as illustrated in FIG. 2. The sensor plate 40 has five through holes 42 defined therein. The through holes 42 are arranged in a cruciform formation, centred with the sensor plate 40. Each throughhole 42 has a microphone 44 mounted therein, oriented so as to be directed to detect sound emanating from the exterior of the acoustic sensor 20.

The reader will appreciate that, whereas this specific embodiment has five microphones, other embodiments may have fewer, or more. Typically, three or more microphones will produce desirable results.

Whereas, in the specific embodiment, a cruciform arrangement is provided, generally other embodiments may have other arrangements. Typically, a non co-linear array may produce desirable results.

Each microphone 44 has an output connection (not shown), which are collectively indicated by an arrow extending from the acoustic sensor 20 to the gunshot detector 30.

Figure 3:
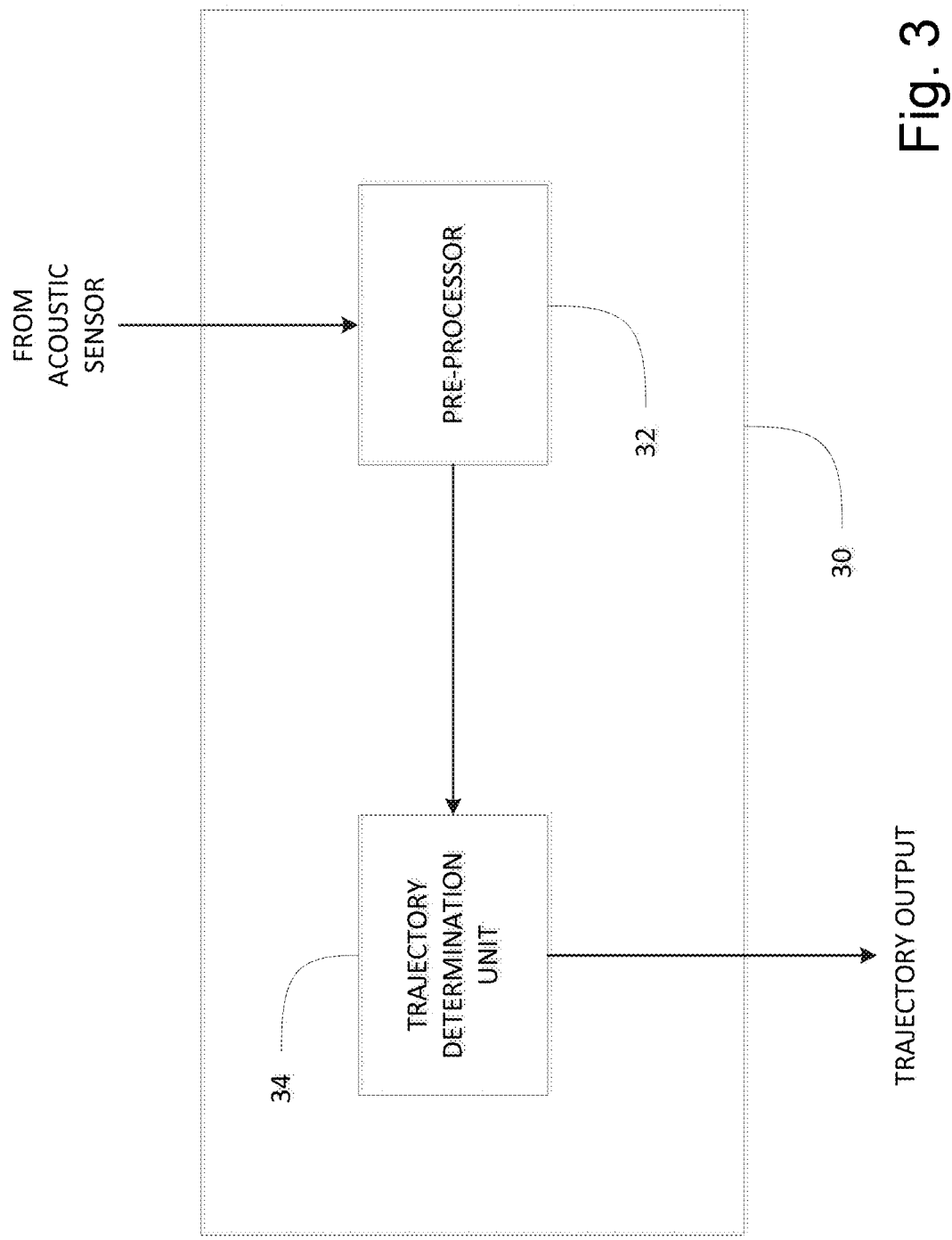
FIG. 3 is a schematic diagram of a gunshot detector of the illustrated embodiment.

The architecture of the gunshot detector 30 as illustrated in FIG. 3 is, generally speaking, composed of two stages. A first stage comprises a pre-processor 32 which receives the analogue feeds from the five microphones 44 of the acoustic sensor 20, and processes these into digitised representations of frequency and bearing information gained from the microphone outputs.

A second signal processing stage comprises a trajectory determination unit 34 which processes the digital information produced by the pre-processor 32 so as to produce a reading of trajectory information for a bullet as detected by the detector 30.

Figure 4:
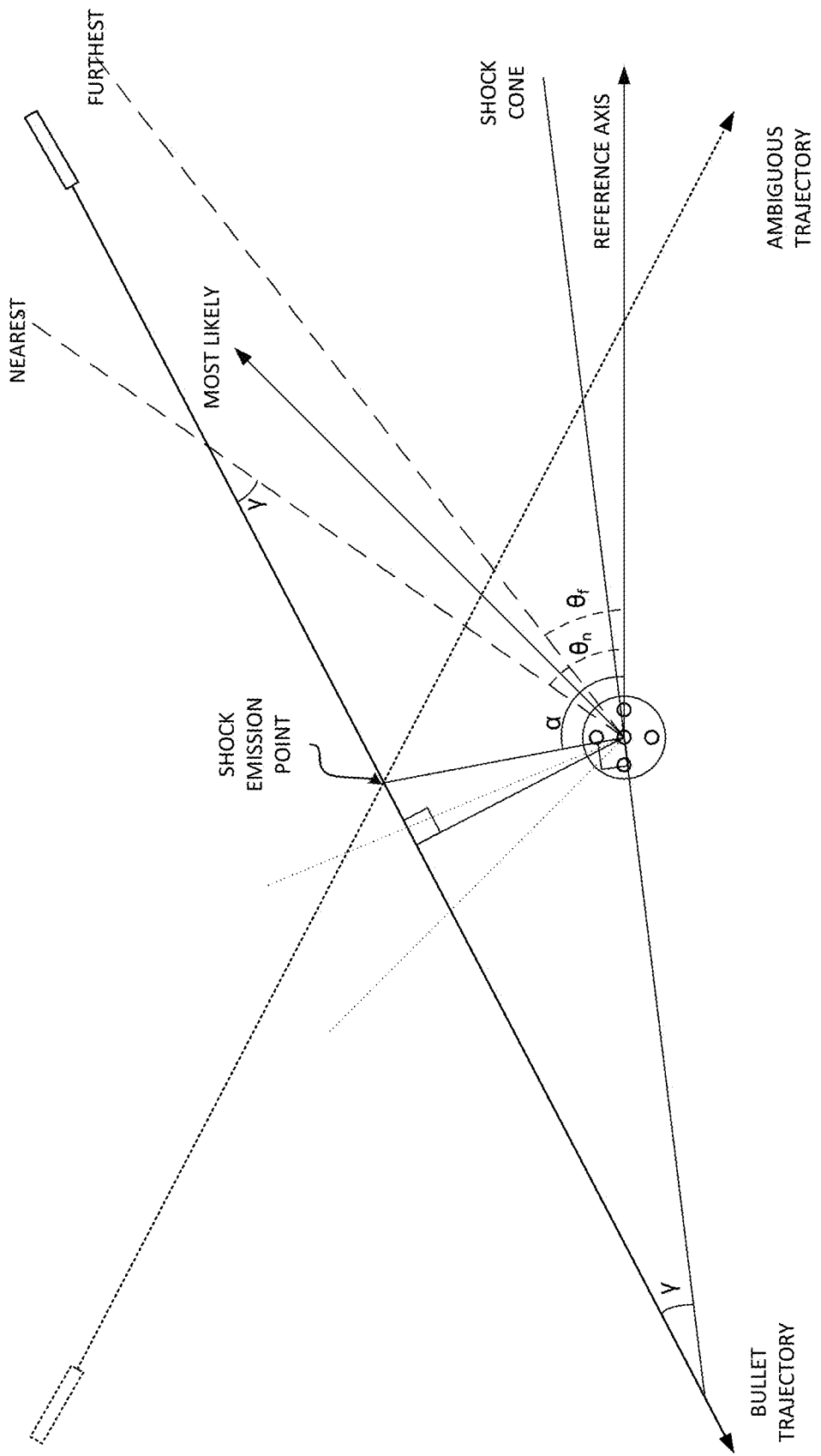
FIG. 4 is a diagram showing geometry from which candidate trajectories can be determined from a shockwave from a passing projectile.

FIG. 4 illustrates the manner of calculating, via detection of a shockwave, two possible candidates for a trajectory of a passing supersonic projectile such as a bullet, by the present embodiment.

As shown, as a bullet passes the sensor 30, which is bearing-sensitive (i.e. cross-correlating the outputs of the cruciform microphones can resolve signals to a direction measurement), there is a single point in that trajectory, the indicated shock emission point, from which the emitted shockwave can be received at the sensor. This is shown as the perpendicular to the shock cone marked in FIG. 4. The shock cone itself is defined by an angle γ, whose tangent is the ratio of bullet mach speed to the speed of sound in air.

Analysis of the signals, picked up by the sensor, enables determination of a bearing measurement α for the shock emission point. As will be understood by the reader, determining the bearing of the shock emission points does not define a single trajectory; an alternative solution (marked "Ambiguous trajectory" in FIG. 4) is also possible and is shown in broken line as a result. At this point in the analysis, this ambiguity cannot be resolved.

Using assumptions about the distance of the gun from the sensor, a 'fan' of probabilities can be derived. Assuming that miss distances are small in comparison with the range of the shot, and with a fan centre line representing a mean bullet velocity of Mach 1.87, then the expected ambiguous gun positions are at angles of $$\theta = \pm\left(90 - \sin^{-1}\left(\frac{1}{1.87}\right)\right)$$

The upper limit of bullet velocity is, as stated earlier, typically Mach 2.5 for a typical gun. A lower limit of Mach 1.2 is normally appropriate as, below this, the fluid dynamics of the progress of the bullet through the air becomes "trans-sonic" and chaotic acoustic behaviour can result. These ranges are represented in FIG. 4 by the bounds on the projectile angle (with respect to the reference axis) of $\theta_n$ (near) and $\theta_f$ (far).

As a result of this, in this specific example, two ambiguous rough shooter bearing estimates can be derived. These relate to the bearing α of the measured shockwave as α±57.7°.

The miss distance, in this example, can be calculated from the peak shockwave pressure and period, with reflections removed.

With a single shockwave and no further information from a muzzle-blast or derived bullet velocity, range cannot be estimated. Although the elevation of the emission point may be determined, the derived knowledge of the bullet's shockwave emission point alone (where the lines cross in FIG. 4) is insufficient to allow derivation of elevation information for the weapon from which the bullet emanated.

Figure 5:
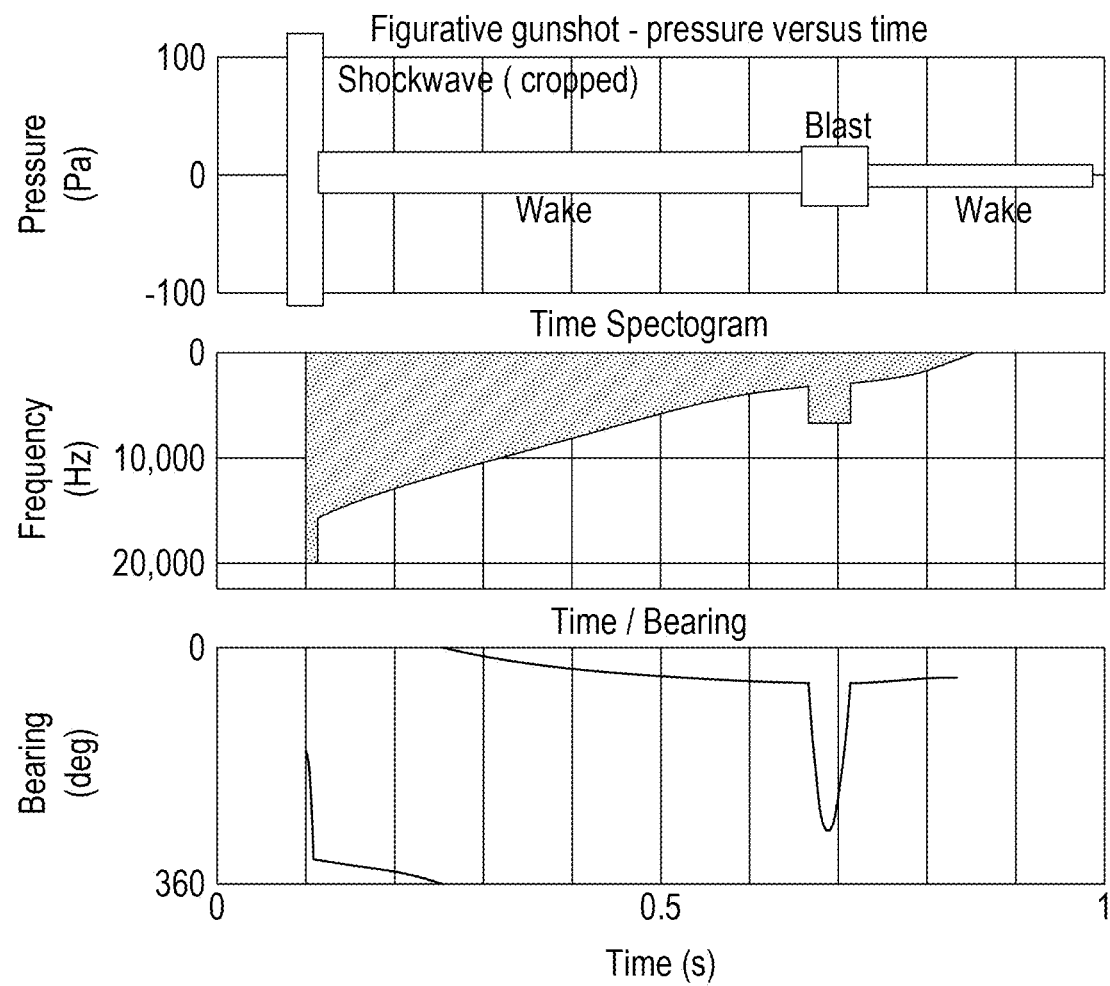
FIG. 5 is a graphical representation of digital information derived from sensor signals of the illustrated embodiment.

As shown in FIG. 5, the information produced by the pre-processor comprises a number of data sets derived from the acoustic information detected at the detector 30. In this example, three plots are shown, reflective of the information that can be derived. FIG. 5 illustrates plots for a 'normal' gunshot, i.e. one projected at supersonic speed from a muzzle of a firearm.

The top plot in FIG. 5 shows a time domain plot of atmospheric pressure change at the detector 30. As can be seen, and as is marked with the aid of broken line bounding boxes, a first effect is that of a shockwave, at 0.13 seconds, then a blast at 0.58 seconds, and a wake extending from 0.14 seconds to at least 0.4 seconds. The reader will note that the wake actually extends long beyond this point, but is obscured in FIG. 5 by the scale of the vertical axis.

The second plot is a spectrogram representing amplitude over a spectrum of frequencies, from baseband up to 24 kHz, over time. Frequency is on the vertical axis, time is on the horizontal axis, and amplitude of a particular frequency at a particular point in time is represented by intensity of colour. In this example, lighter shading, to white, represents high amplitude and dark shading represents little to no activity at that frequency at a particular time.

The third plot is of bearing versus time. This bearing reading is calculated using the whole energy within a succession of time domain data blocks. This operation can be modelled using the MatLab function a tan 2, though the reader will appreciate that other analytical approaches can be taken.

The wake, as represented in FIG. 5 by the upper plot, is created by the physical effect of cavitation behind a bullet travelling at high speed. The sound generated by this cavitation is further modulated by spin of the bullet, such as spin imparted by rifling in the muzzle of the firearm. In practice, bullets tend to have spin rates of a few hundred revolutions per second. This results in an audible wake, with persistence of up to a second.

So, given that sound travels through air at a reasonably constant speed, the first point detected at the acoustic sensor 30 is from the point of the bullet's trajectory nearest to the detector. This is a unique point. Thereafter, the sound received at the sensor 30 has contributions from earlier points, and later points, in the trajectory, which arrive at the sensor simultaneously.

Figure 6:
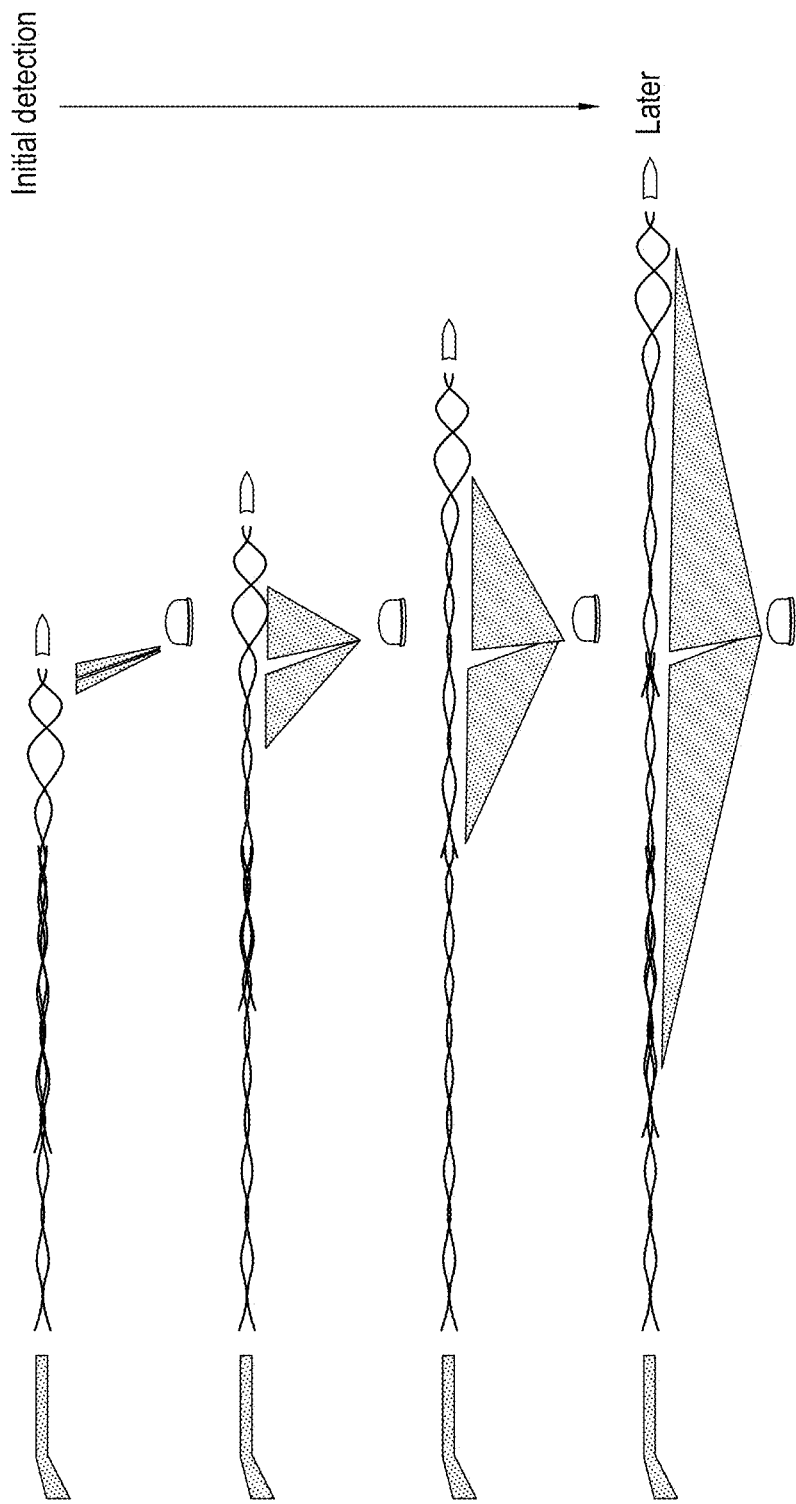
FIG. 6 is a graphical representation of a bullet passing a sensor of the illustrated embodiment, to illustrate a wake and the acoustic effect thereof.

This means that the wake is detected at the sensor as having come from two different directions, one pointing back towards the gun, the other pointing forwards to the eventual destination of the bullet. This is illustrated in FIG. 6. Four cases in the passage of a bullet past the sensor 30 are shown. The top case shows the bullet at the near point, the other cases show the bullet at progressively farther distances past the detector. The cones illustrated as pointing towards the detector illustrate the extent to which, as the bullet passes progressively further beyond the sensor, sound is gathered from an increasing portion of the bullet trajectory.

It has been observed that the two contributions, forward and backward, are not symmetrical. The further toward a target, the slower the bullet, so the sound generated in the wake of the bullet reduces.

Whereas the fourth case, at the bottom of FIG. 6, gathers acoustic information from the earliest part of the trajectory, where the bullet was at its fastest (and thus the wake was the loudest), account must also be taken of the fact that this portion of the wake is the oldest and thus susceptible to deterioration over time, as well as attenuation over distance.

As the evidence shows in FIG. 5, the audible (and detectable) wake is persistent. Experimental trials of an embodiment have shown that, even after a target strike, there was a detectable wake contribution from the direction of the target.

The effect of this can be seen in FIG. 5. An initial (correct) bearing measurement on the shockwave disappears for 50 ms. This is because the two spatial contributions are of similar magnitude so leading to an insoluble bearing calculation. After this, the contribution pointing towards the target dominates, leaving a track whose asymptote is 180 degrees from the direction of the firing gun. The reason for the latter situation lies in the fact that the trail back to the gun has had longer to dissipate, and may be in part further away.

The reader will note that a significant portion of the energy represented in the plots in FIG. 5 is at relatively high frequencies (1 kHz to 20 kHz). This means that the acoustic energy attributable to the bullet and associated effects can readily be distinguished from other acoustic noise sources, such as vehicular noise, which may be characterised by much lower frequencies.

In conclusion, the wake information can be used to remove ambiguity from a shockwave-only gunshot trajectory tracing solution.

Figure 7:
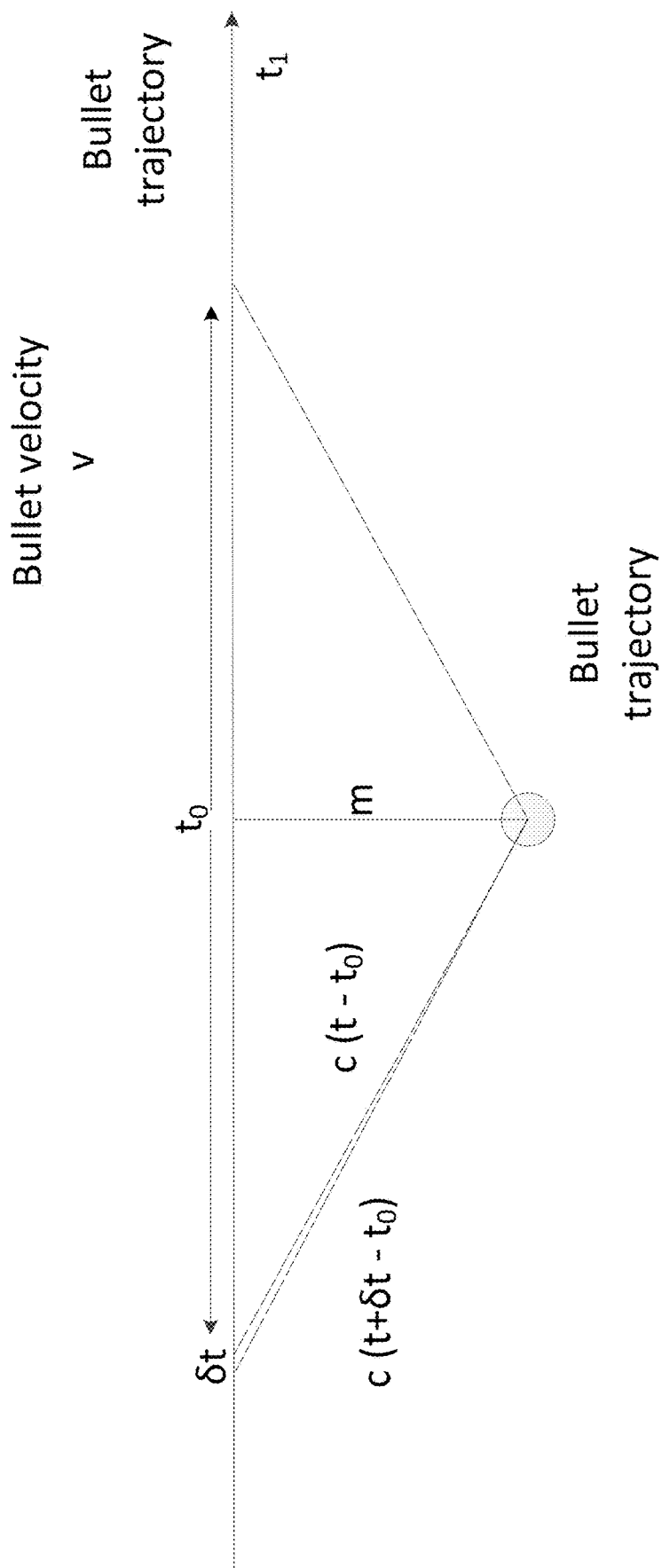
FIG. 7 is a graphical representation showing geometry from which trajectory information can be derived from wake information for a sensed passing projectile.

As shown in FIG. 7, the geometry of a bullet trajectory with respect to an observer position can be described at any point in time t.

In this example, detected pressure is P, the time of nearest approach is $t_0$, the miss distance is m, and the speed of sound is c.

Therefore, the detected pressure, at a time $t_1$, is:

$$P = P_0 \left(1 - e^{-\frac{(t-t_1)}{\tau}}\right)$$

For an element of the trajectory time length cδt, which at time $t_1$ is of age $\Delta t + t_1 - t_0$, the overall pressure becomes:

$$P = P_0 \int_{t=t_0}^{\Delta t} \frac{\left(1 - e^{-\frac{(\Delta t + t_1 - t_0)}{\tau}}\right)}{\sqrt{c^2(\Delta t + t_1 - t_0)^2 - m^2}} dt + \int_{t=t_0}^{\Delta t} \frac{\left(1 - e^{-\frac{(-\Delta t + t_1 - t_0)}{\tau}}\right)}{\sqrt{c^2(-\Delta t + t_1 - t_0)^2 - m^2}} dt$$

Evidently, this demonstrates that the relationship between pressure and time is complicated. In the long term, the contribution nearer to the target (represented by the right hand integral) dominates. In the short term, both contributions are roughly equal. Although the bullet may "race ahead", the integrated energy contributions nearer to the miss point, being close, will dominate, so an imaginary "single point of emission" moves away from the miss point more slowly than the bullet does.

Hence, analysing wake data can allow, with calculations based on the above geometry, a determination as to which of the two possible trajectories identified with respect to the shock wave is the correct solution. It can also confirm the trajectory to the extent that additional certainty can be applied, and that the assumed range of error can be reduced.

Further analysis can be applied to the received acoustic signals that have been determined to be the result of a bullet's wake. For instance, if a bullet emanates from a rifled bore, it will have been imparted a spin motion about its axis of projection. This spin will cause modulation of tones onto the largely random noise of the wake signature. Thus, demodulation of these tones in the frequency domain can allow analysis, against known characteristics, and from which spin rate can be determined. Spin will slow over time, which can also be detected.

Similarly, if a bullet is tumbling, i.e. it has entered a state whereby it is no longer travelling in a regular, axially spinning, motion, it will initiate an acoustic signature characteristic of such motion. This, again, with suitable prior information, can be determined from the acoustic wake signal.

All of this additional information, i.e. spin rate, deterioration of spin, detection of tumbling motion, can contribute to further knowledge of the projectile, and the weapon from which it emanates. With prior information as to what guns and bullets produce particular signatures, it may be possible to identify the nature of the bullet, and/or which gun has been used.

As will be observed, monitoring the change of calculated bearing over the passage of time will eventually result in entry into a phase wherein wake direction stops changing. This phase will be associated with target strike. Thus, target strike can be detected, even if the strike event does not result in directly detectable acoustic signals.

Embodiments disclosed herein may be beneficially applied to gunshot and cannon-shot detection aboard aircraft and helicopters, where the blast will almost never be detected. The frequency distribution of the wake signal will still allow detection of nearby shots, even in such very loud environments.

An advantage which may be exhibited by embodiments such as described herein, is that the wake signal is dissimilar to, and distinguishable from, likely interfering sounds, and embodiments thus provide a means for rejecting such sounds with confidence.

While certain embodiments have been described, these embodiments have been presented by way of example only, and are not intended to limit the scope of the inventions. Indeed, the novel systems, devices and methods described herein may be embodied in a variety of other forms; furthermore, various omissions, substitutions and changes in the form of the systems, devices and methods described herein may be made without departing from the spirit of the inventions. The accompanying claims and their equivalents are intended to cover such forms or modifications as would fall within the scope and spirit of the inventions.

The invention claimed is:

1. A method of detecting trajectory information for a supersonic projectile, comprising:
   collecting acoustic detection signals from an array of detection microphones;
   determining from at least one of the acoustic detection signals the existence of an acoustic signal characteristic of a supersonic projectile passing on a trajectory nearby;

processing a shockwave portion of each acoustic detection signal, to determine first and second shockwave-based estimates of the trajectory of the supersonic projectile;

processing a wake portion of each acoustic detection signal, the wake portion being after the shockwave portion, to determine a wake-based estimate by comparing the first and second shockwave-based estimates to the wake-based estimate and selecting one of the first or second shockwave-based estimates that agrees with the wake-based estimate of the trajectory of the supersonic projectile; and resolving the first and second shockwave-based estimates using the wake-based estimate to determine a disambiguated estimate of the trajectory of the supersonic projectile.

2. A method in accordance with claim 1 wherein the processing of the wake portion comprises processing within a frequency range selected to distinguish from an external noise source.

3. A method in accordance with claim 2 wherein the frequency range has a lower bound of at least 1 kHz.

4. A method in accordance with claim 1 wherein the processing of the wake portion comprises forming a series of data blocks for each acoustic detection signal, filtering said data blocks, and converting said filtered data blocks into the frequency domain.

5. A method in accordance with claim 4 wherein the processing of the wake portion further comprises deriving a series of bearing estimates from the frequency domain filtered data blocks.

6. A method in accordance with claim 5 wherein the processing of the wake portion further comprises fitting a curve to the bearing estimates, and to derive from an asymptote of said curve a bearing estimate of a projectile from which said wake portion was derived.

7. A method in accordance with claim 1 wherein the processing of the wake portion comprises determining existence of at least one frequency component, distinguishable from noise, and for the frequency component, associating said component with a spin speed of a projectile, as a characteristic of the motion of the projectile.

8. A method in accordance with claim 7 wherein the processing of the wake portion comprises determining from said processing of said wake portion, a rate of change of said spin speed, as a characteristic of the motion of the projectile.

9. A method in accordance with claim 8 comprising determining a miss distance estimate, being an estimate of the closest distance between the projectile and the detection microphones, and processing the rate of change of spin speed with the miss distance estimate to determine an estimate of distance of projectile origin from the detection microphones.

10. A method in accordance with claim 8 comprising determining a miss distance estimate, being an estimate of the closest distance between the projectile and the detection microphones, and processing the miss distance estimate with the trajectory estimate to obtain a target bearing estimate.

11. A method in accordance with claim 10 and comprising determining a target position estimate from the target bearing estimate.

12. A method in accordance with claim 1 wherein the processing of the wake portion comprises determining existence of at least one frequency component, distinguishable from noise, characteristic of tumbling motion of a projectile, as a characteristic of the motion of the projectile.

13. A method in accordance with claim 7, comprising determining from said identified one or more characteristics of the motion of the projectile, characteristics of a candidate device corresponding with the source of said projectile.

14. A method in accordance with claim 1 and comprising monitoring, over time, the trajectory of the projectile, detecting a phase in which the trajectory remains unchanged, associating entry into that phase with strike of said projectile on a target, and determining an estimate of target position.

15. A gunshot detector operable to detect trajectory information for a projectile on a supersonic trajectory, the detector comprising:

a plurality of acoustic transducers, arranged in an array in a reference plane, each transducer being operable to convert acoustic excitations to electrical detection signals;

a signal processor responsive to detecting the existence of an acoustic signal characteristic of a supersonic projectile passing on a trajectory nearby, operable to process detection signals from the acoustic transducers to determine:

first and second shockwave-based estimates of the trajectory of the supersonic projectile based on processing a shockwave portion of each acoustic detection signal;

a wake-based estimate of the trajectory of the supersonic projectile by processing a wake portion of each acoustic detection signal, the wake portion being after the shockwave portion; and on the basis of the first and second shockwave-based estimates on the one hand, and the wake-based estimate on the other hand, a disambiguated estimate of the trajectory of the supersonic projectile by comparing the first and second shockwave-based estimates to the wake-based estimate and selecting one of the first or second shockwave-based estimates that agrees with the wake-based estimate.

* * * * *